Feb. 13, 1934.   A. AMES, JR   1,946,925
CLINICAL OPTICAL MENSURATION INSTRUMENT
Original Filed April 23, 1928   2 Sheets-Sheet 1
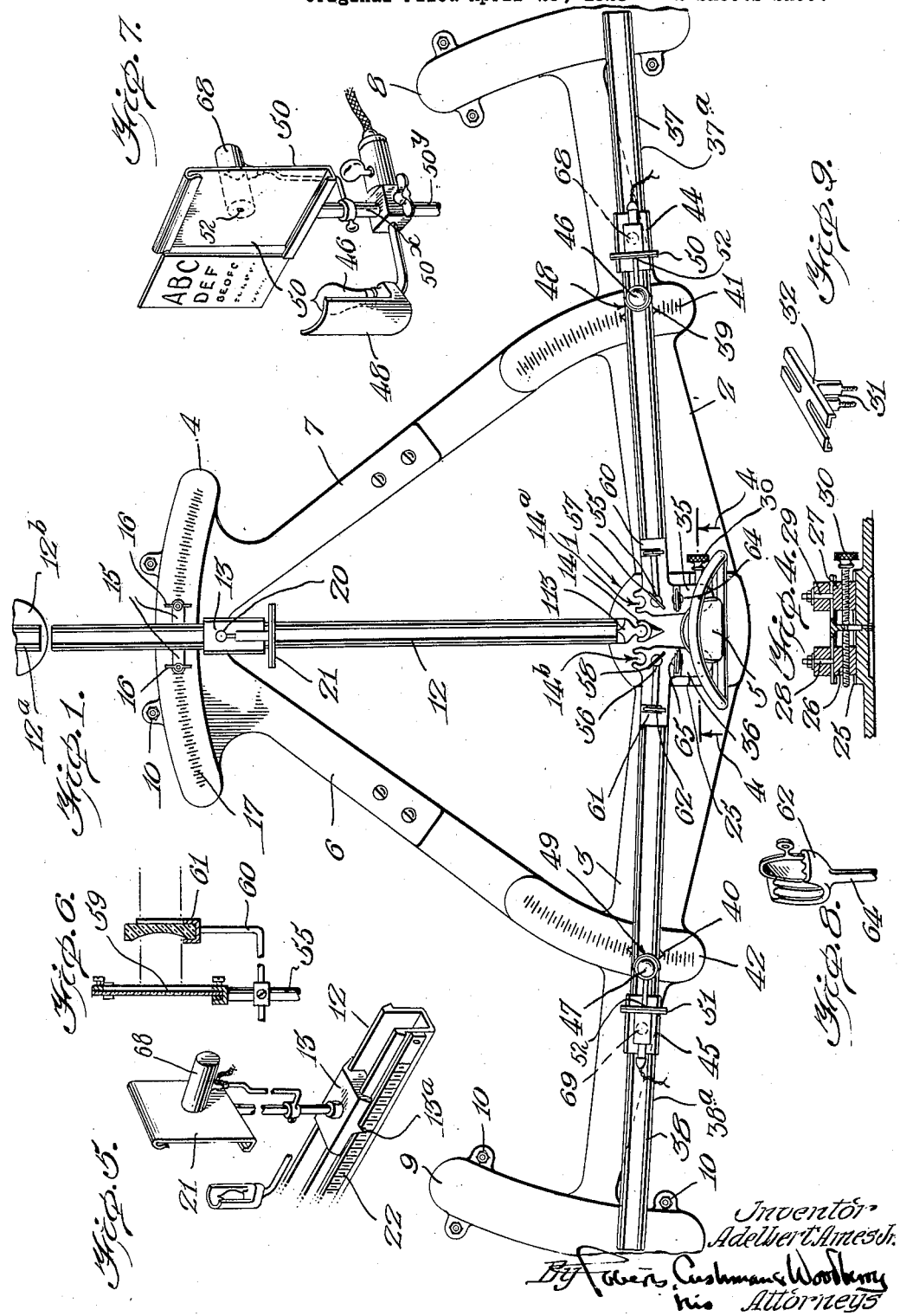
Inventor
Adelbert Ames Jr.
By Roberts Cushman & Woodbury
his Attorneys Feb. 13, 1934.   A. AMES, JR   1,946,925
CLINICAL OPTICAL MENSURATION INSTRUMENT
Original Filed April 23, 1928   2 Sheets-Sheet 2
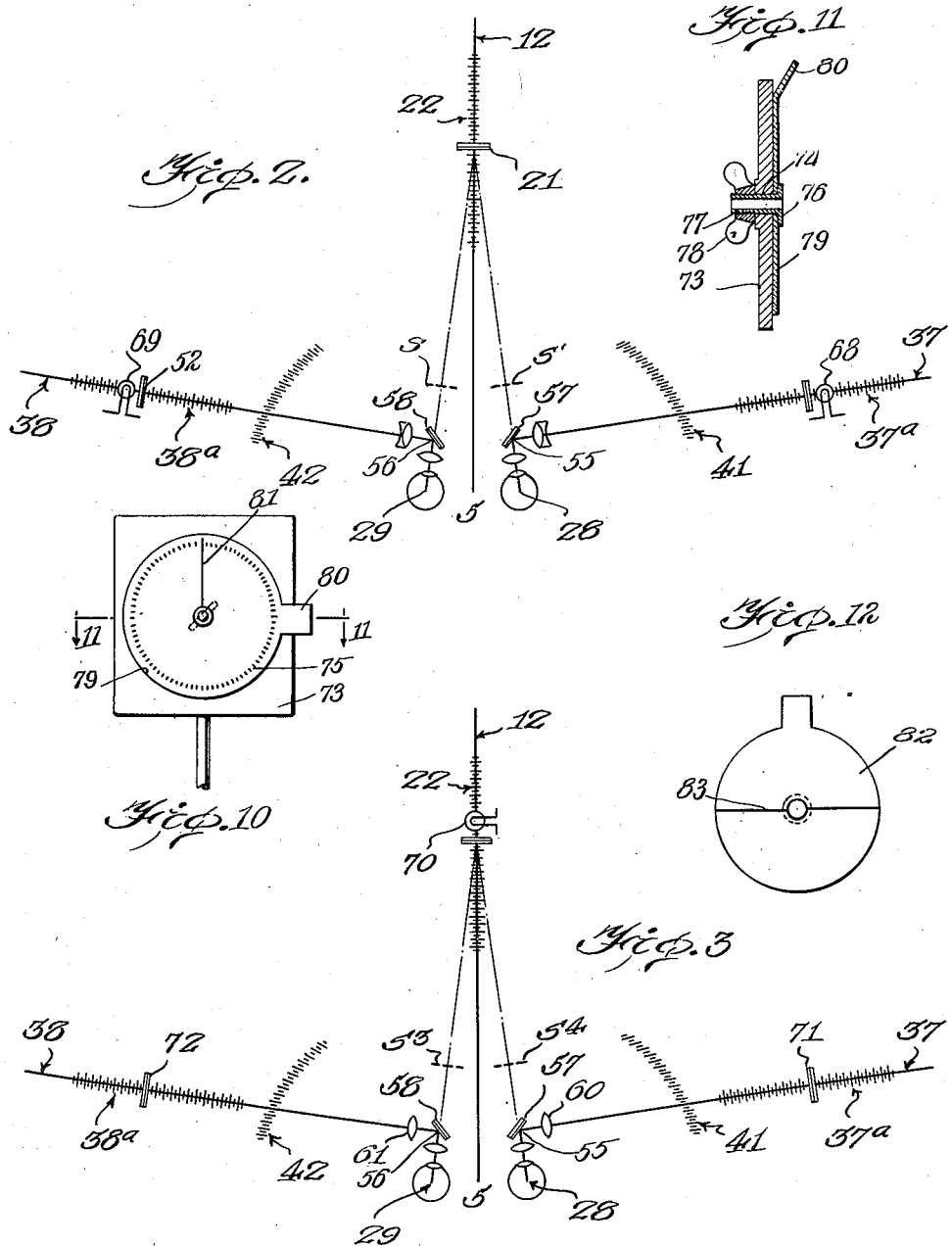

Patented Feb. 13, 1934

1,946,925

UNITED STATES PATENT OFFICE 1,946,925

CLINICAL OPTICAL MENSURATION INSTRUMENT

Adelbert Ames, Jr., Hanover, N. H., assignor to trustees of Dartmouth College, Hanover, N. H., a corporation of New Hampshire Application April 23, 1928, Serial No. 272,027
Renewed October 14, 1933

31 Claims.  (Cl. 88—20)

This invention relates to devices for determining optically the physiological condition of the human eyes; for example for diagnostic purposes, or as a direct aid to the provision of corrective devices for defects of the eyes.

An object of the invention is to provide means facilitating the rapid methodical examination of refractive, muscular and reflexive qualifications of the organs or vision of a subject in aid of a diagnostic method substituting instrumental determination of quantities affecting the behavior of the eyes for observation by the subject and his report, particularly in respect to focus, accommodation and convergence, and certain phorias or muscular imbalance effects, including fusional amplitudes, horizontal, vertical and cyclo-fusional.

The capacity of the subject to read print or to discover other details of the familiar type of test chart, such as a Snellen chart, at a certain distance does not necessarily show that the subject has actually focused his eyes at that distance. Some persons mistake broad and general perception of outline or form of words and letters for actual visualization, and the observer can never be certain that the apparent focal distance of eyes reported by a person under observation is anything more than a measure of the training in appearance memory of the person under observation. It is much more satisfactory to determine what is the actual focal distance of the exterior conjugate focus of the lens system of the eye when the patient is fixating a reading or other chart, and also looking at a test means such as another chart or a bright point object, in addition to the first-mentioned chart which functions merely as a fixation means, and another object of the invention is to provide convenient apparatus for this determination.

In one exemplification the devices comprise in one assemblage means for the determination of the true focus of each of a subject's eyes, as distinguished from the distance at which the subject reports a visual object to be in focus. The instrument also provides in one assembly, in addition to means for mensuration of focus, means for determining the angular quantities, for the eyes severally or together, of phorias or irregularities of muscular balance and the fusional amplitudes. The instrument also provides means for determining the effect of variation of one ocular function upon the others, as for example the effect that varying the convergence has on the accommodation, or vice versa, the effect of accommodation on phorias, etc. In general the instrument combines distance and angle measuring devices each utilizing in part devices useful for the other measurement, and capable of informing the practitioner about the condition of the subject's eyes with a minimum of intelligent judgment by the subject.

The invention will now be explained with the aid of the description of a specific instance of apparatus, but the principles of apparatus exemplifying the invention may be embodied in many different assemblies of instruments.

In the accompanying drawings, referring to a form of the device selected for illustration, Fig. 1 is a plan illustrating apparatus set up for use;

Figs. 2 and 3 are each diagrams in plan illustrating use of the apparatus for one of two different diagnostic determinations;

Fig. 4 is a section on the line 4—4 of Fig. 1;

Fig. 5 is a detail in perspective of a target or light carriage for one of the slideways, typical of others;

Fig. 6 is an enlarged elevation partly in vertical section of a standard carrying a reflector and lens;

Fig. 7 is an enlarged detail in perspective of an illuminated target device having provision for use as an artificial star;

Fig. 8 is an enlarged detail in perspective of a test lens standard;

Fig. 9 is a detail of parts shown in Fig. 4.

Fig. 10 is an elevation of a target used for certain purposes;

Fig. 11 is a section on line 11—11 of Fig. 10; and

Fig. 12 is detail showing a modified form of an element of Fig. 10.

Referring now to Figs. 1 and 2, the common mode of determining the focus of the eyes of a subject under examination is by the use of Snellen's reading test charts, usually illuminated and held erect at a distance of twenty feet, the determination being made by discovering what size of print can be read on a chart at that distance or closer distance, by the report of the subject. This invention substitutes the determination of focus by the report of best vision of a test object such as another chart or a bright point or artificial star superposed apparently on the fixation chart or target being looked at, the required report being of the appearance of the test object as, for example, the least size of the bright image. This is done by superposing on the retina two images, one of the apparent object confronting the subject, and the other the image of the test means (preferably a monocular image) which can thus produce no connotation of distance, and induce no simulated accommodation in an eye already occupied with effort to observe the chart or target object. The method of making a reading comprises alternating the actual or virtual focal distance of the test means, and measuring the virtual or actual exterior conjugate focal distance of this means. No voluntary comparison of observations by the subject is relied upon; he is asked merely to look at a chart, to say when the test chart is sharpest or the star image is smallest and brightest.

For example, the apparatus provided may comprise any form of bed plate, such as a central member 1, a horizontal arm 2 and a like horizontal arm 3, each extending laterally; and a secondary bed plate 4 at a distance in front of a chin and forehead positioning rest 5 for the subject, arms 2, 3 and bed 4 preferably being connected by struts 6 and 7, which may be of conjoined sections for portability.

The arms 2 and 3 terminate in subordinate bed plates or bases 8 and 9 respectively, and each of these bed plates as shown may be provided with levelling screws 10 adapted to be adjusted to position the apparatus on a table or pier.

Upon the bed or frame constituted of these members there are provided straight slideways, severally for a target for direct vision of the subject, and for objects to be viewed indirectly. For example, a straight slideway 12 may be provided for a carriage 13 adapted to be moved from and toward the position of the subject at 5. Slideway 12 may be provided with a cone-and-socket interlocking joint at 113, 14 respectively on slideway 12 and in a lug on the central bed plate 1, the slideway 12 resting on the arc-shaped bed plate 4 on feet 15, which may carry reading pointers 16, 16 for an arc scale 17. The slide 13 carries on an erect post 20 a target 21 on which a chart or card may be attached. The carriage 13 is provided with a suitable index mark 13$^a$ to read against a scale at 22 on the slideway 12. For purposes presently explained the cone 113 at one end of the slideway 12 may be lifted and moved into a socket similar to that at 14 as shown at 14$^a$, 14$^b$ on other elements of the instrument.

The bed plate 1 is provided with a transverse groove at 25, Fig. 4, in which there are free to slide blocks 26, 27 respectively tapped for right and left threads on an adjusting screw 30, and respectively carrying threaded pivot stems 28 and 29 symmetrically toward and away from the center line of bed 1. Screw 30 bears in a slot 31 in a depending web of a hold-down piece 32 for blocks 26, 27. Rotation of screw 30 brings the centers represented by the pivot studs 28, 29 to the same distance apart as the interpupillary distance of the subject.

The pivot studs 28, 29 (Fig. 4; also diagrammatically indicated in Fig. 2) take into suitable pivot bores in rectangular end pieces 35 and 36 of slideway arms 37 and 38, which slideways may be provided with index pointers 39 and 40 respectively to read on arcuate scales 41 and 42 central at the mean position of the pivot studs 28 and 29. The readings of the indexes 39, 40 on the scales 41, 42 indicate deviation from a right angle to the line established by the slideway 12.

The slideway arms 37 and 38 are ways for slides 44 and 45 respectively, each of which may comprise a suitable mounting for a light source, such as incandescent lamps at 46, 47 to illuminate the targets having each a shield 48, 49. The slides 44, 45 may also carry on a suitable standard target supports 50, 51 for a card or chart. The target supports are preferably blackened.

As illustrated in Figs. 1 and 7, one kind of point source in a holder 68, 69 for light may be an incandescent filament situated behind shining through a small hole 52 in the target. The target 50 and its attachments is capable of vertical adjustment. For example, the supporting standard 50$^x$ may telescope into 50$^y$ and be held by a suitable set screw. The slideway 12 and the slideways 37 and 38 may be, as illustrated in Fig. 5, double track channels, and these tracks are preferably of the same dimension so as to make the slides 44, 45 and 13 interchangeable. The side faces of the slideways 37 and 38 are provided with linear scales 37$^a$, 38$^a$ reading in any convenient units, preferably the same as scale 22, against a mark carried by the respective slides 44 and 45. These scales are read to establish the distance of the artificial star or chart at 52 carried by the slides 44 or 45, from each eye of the subject, as measured along the center line of slideways 37, 38 and, by reflection, along the position of the axis of convergence of the eyes of the subject when the subject is looking at a chart carried in the target 21 of the slide 13. To enable transference by reflection to the line of vision of an object on the slideway arms 37 and 38, these arms at their junction with the portions 35 and 36 each carry a vertical standard 55 or 56, upon the upper end of which is mounted, in a plane perpendicular to the bisector of angle 28, 55, 52 or 29, 56, 52, a plane parallel transparent reflector 57, 58, respectively. The incident face of each of these reflectors is half-silvered, as at 59, Fig. 6, so as about equally to transmit it and to reflect light incident on the face of the silver coating toward the subject. The subject under examination, whose attention is focused on the target 21, thus has superposed upon the target 21 the visual appearance of the artificial star or other object on the slides 44 and 45, respectively, in the images of his right and left eyes, respectively.

Each of the slideways 37 and 38 may be provided conveniently as parts of the standards 55 with supports 60, each terminating in a holder 61, Fig. 6, for one of a suitable like set of lenses, adapted to modify the image of the artificial star or chart carried on the slide 44 or the slide 45 so as virtually to place these at any suitable distance for the purpose of measuring the focal distance of the eyes. Mounted upon the arms 35 and 36 the standards 64, 65 respectively, may carry similar holders 62, Fig. 8, for lenses positioned preferably at the anterior foci of the eyes. Like lenses in these holders may be initially employed for the purpose of virtually placing the chart 21 at the desired distance (for example, 20 feet), and when mensuration has been effected, the holders 62 on the standards 64 and 65 may serve as holders for test corrective lenses.

The slideway 12 may, if desired, be supplemented by a short section of such a slideway, as shown at 12$^a$ at the top of Fig. 1, on a floor standard 12$^b$. The carriage 13 may be put on the supplemental slideway 12$^a$ when it is desired actually to have an object at a distance of twenty or more feet away from the subject.

The operation of determining the condition of focus, convergence and other functions of the eyes under observation will be more readily understood from Figs. 2 and 3. The subject being properly positioned by any usual universally adjustable head rest at 5, the carriage 13 is placed at the distance desired by the operator, as measured by the scale 22 on the slideway 12 or by the known distance of the auxiliary slideway 12a, and any suitable form of Snellen chart placed on the target 21 is properly illuminated. Preferably the room used for the observation is darkened. The subject is instructed to read the chart or describe it.

The screw 30 is adjusted to bring the centers of pivot stems 28 and 29 to the interpupilary distance and the head is positioned so these centers lie directly under the center of rotation of each eye and one or both of the lights at 68 or 69, turned on to produce an artificial star at 52 whose position is in the horizontal plane of, for example, the right eye of the subject, and the slideway arm 37 is then moved on its pivot stud 28 until the subject reports that the star image is central on the chart on the slide 13. There may be cross marks or a central mark on the Snellen chart 21 accurately to position the image of the artificial star viewed by reflection in the mirror 57. The operator then moves the slide on the slideway 37 to find on the report of the subject what is the position at which the artificial star image is smallest and brightest. Whatever the distance of the target 21 upon which the subject's right eye is focused, the true exterior conjugate focal distance of that eye may now be read directly on the scale 37a on the slideway 37.

The scale 41, whatever the system of angular measurement employed for it, reads the convergence angle 5, 21, 28, it being borne in mind that the reflector 57, 58 is accurately set at 45° to the center lines of the rectangular axes, respectively, of the end pieces 35 and 36, and the slideway arms proper 37 and 38.

A similar manipulation for the left eye involving the light 69, the light 68 being extinguished, may be relied upon to show peculiarities of the focal distance of the left eye compared to the right eye.

When both eyes are open and in use for binocular images both lights 68 and 69 may be lit, and the respective arms 37 and 38 adjusted to cause convergence upon the center line of the target 21 of the respective artificial star images, these being brought into focus severally by positioning on slideways 37 and 38, respectively, of the respective slides on these slideways.

In order to determine horizontal phorias, the proceeding will now be evident. A screen is inserted at s or s', Fig. 2, to occult the direct vision of the left eye or right eye, respectively. With the screen at s', and the artificial star at 52, 68, illuminated, the patient is viewing the artificial star with his right eye by reflection at 57 while the left eye is fixed on the target 21. Muscular imbalance of the right eye then asserts itself as an apparent displacement of the artificial star image to right or left, up or down, in respect to the center point of the target 21. The degree of lateral diversion of the balance point of the axis of the right eye may then be read directly by moving the arm 37 in respect to the scale 41 until the right eye star image is centered in respect to the left eye target image. These operations may now be repeated inversely in respect to the left eye, the light at 69 being lit and the screen at s. Vertical phorias are measurable by displacing vertically the artificial star in respect to the arm 37 or the arm 38. Or these may be estimated by the provision of a scale marks on the target 21; these scale marks having a known angle in respect to the center of the respective eyes at the distance employed for the measurment of vertical phorias. A rough estimate of lateral and vertical phorias may be made without employing the scales 41, 42, by providing a target at 21 divided into squares and depending upon the patient's account of lateral and vertical displacement of the artificial star images, which are central on the target 21 during binocular vision, a screen being inserted at s or s', as before, when the respective artificial stars are illuminated to be seen by the screened eye. In a similar way the exterior conjugate focus and phorias can be determined for each eye while the patient is fixating charts at various distances, preferably at infinity, 1 meter, fifty, 33.3, 25 and 20 centimeters.

It is often of importance to determine the "relative accommodation", so called. This qualification of vision relates to variation of the true exterior conjugate focal distance of the eyes under a fixed degree of convergence by fixation on an object at different distances. The described apparatus lends itself easily to undisturbed measurements of this character. For example, as shown in Fig. 3, the target 21 may be replaced, as shown at 70, by an artificial star device of the kind shown in Fig. 7, and the carriages on the arms 37 and 38 may be furnished with matched targets at 71, 72. These may be of any desired character and of the same dimensions.

To determine the relative accommodation of the eyes while they are converged for an object say at fifty centimeters, the targets 71 and 72 are also set at fifty centimeters and the arms 37 and 38 are swung around until the exact centers of the targets 71 and 72 superpose upon the star at 70. The arms are then locked. The exterior conjugate focus of each eye is then measured by moving the star point 70 along 12 until the image is reported smallest and brightest, the other eye being screened by the screen S³ or S⁴. To enable this motion on a radius of the eye under test when the eyes are fixed on the superposed images by reflection of the visual targets, the cone 13 for track 12 may be moved to the socket 14a or 14b on the radial line of the eye under test.

To measure how much the accommodation of the eyes changes at a given convergence when the targets they are fixating on are at different distances, the targets 71 and 72 may simply be moved in or out along the slides 37 and 38 and the exterior conjugate foci of the eyes measured as above described.

These determinations can be worked out for any desired number of different convergences.

To measure the effect of changing convergence on the accommodation when the eyes are fixating targets at a given distance, instead of moving the targets 71 and 72 along the slides 37 and 38 they may be left fixed at fifty centimeters. The convergence of the eyes is then changed by swinging the arms 37 and 38 along the scales 41 and 42, in steps preferably of meter angles, the accommodation of each eye being measured at the various convergences as above described.

This effect of convergence on accommodation can be worked out with the targets 71 and 72 placed at any desired number of different distances.

To measure the fusional amplitudes the light at 70 is extinguished and the two targets 71, 72 on the side arms 37 and 38 are then each placed at any desired distance from the eye, such as 50 cm. The arms are set on the scales 41, 42 so that the eyes as they view the images of the targets reflected from the half silvered mirror, converge at a distance of 50 cm. Usually the two images will be fused. The two arms are then moved slowly outward to cause divergence of the eyes while the images are fused. The limit of horizontal fusion is then given by the angular vergence of the arms when the patient can no longer fuse the images, but sees two. The amount of this divergence may be read directly from the scales 41, 42. To find the limit of convergence both arms are moved in until the limit of fusion is reached and the horizontal convergence limit is then read from the scales 41, 42. To measure the vertical fusional amplitudes the arms 37, 38 are positioned corresponding to convergence of fifty centimeters and then the target 71 is slowly raised until the patient sees two targets. This vertical displacement gives a measure of the sursumvergence of the right eye. If target 71 is slowly lowered, the vertical displacement downward to the point at which the patient sees two targets is a measure of the deorsumvergence of the right eye. The vertical fusional amplitudes of the left eye may be determined in a similar manner. These amplitudes may be measured when the subject is looking at objects at different distances by moving the targets to the desired actual or virtual distances, such as 20 feet, 1 meter, 33.3 cm., 20 cm., etc., provided the arms 37, 38 are set at the proper position on the scales 41, 42 so that the eyes will be converged at 20 feet, 1 meter, 33.3 cm. and 20 cm.

It will be obvious that an operator can rapidly determine with the aid of this apparatus the necessary constants for the correction of all of the usual visual defects. Having ascertained by reading the appropriate scales what the defects are, the holder 62 on the standards 60, 61, may now be utilized to receive trial correction lenses, and, if desirable, these lenses may be tried at the fixed convergences and fixed object distances made possible by the instrumental arrangements above explained.

This instrument aids the determination of cyclophorias. The cyclotorsional condition of the eyes, that is their rotational position about their visual axes, is of importance. Faulty cyclotorsional condition is the cause of great ocular discomfort. This condition is similar in its general nature to muscle imbalance in the horizontal and vertical planes. Cyclophoria is a tendency of the eyes to take an abnormal cyclotorsional position, a defect of a nature similar to the more commonly known exophoria, which is a tendency of the eyes to take an abnormal position in the horizontal plane. Cyclotropia is a cyclotorsional condition in which the eyes assume a cyclo-rotation to each other such that the images do not fuse except at the axis. This is similar to an exotropia, for instance, where the eyes are turned out to such an extent that binocular fusion is impossible. Determination of the amount of cyclofusional amplitude; that is, the angular degree through which similar targets can be rotated about their centers in a plane perpendicular to the visual axes and still be kept fused, is of great clinical importance. It is also of great importance that any of these cyclo-conditions of the eyes should be determined while they are converged and accommodated for varying distances.

These measurements can be made most easily on the instrument above described in the following way:

Referring to Fig. 3, on the sliding carriers at 72 and 71 two special targets may be placed. These may each be constructed as shown in Figs. 10, 11 and 12, comprising a target proper 73 having a central hole 74, and a concentric graduated scale at 75, preferably graduated to half degrees, having a bearing in the hole 74, a tubular stud 76 screw threaded at 77 to receive a wing nut 78 being fastened to a transparent circular member 79, which may be a sheet of celluloid and be provided with a tab handle 80. The member 79 may be reclosed or clamped in a rotatably adjusted position by nut 78 or replaced on removing nut member 78. On the face of the member 79 toward the target 73 a radial line 81 printed or engraved in the surface is blackened by a suitable pigment (or whitened if the target 73 is black).

In use the members 79 on two like targets 73 are set so that the radius 81 at the position 71 and the radius 81 on the member 79 at the position 72 extend in opposite directions. In use, the target 71 is viewed by the subject's right eye and the target 72 by the subject's left eye.

If the subject is free from cyclophoria, and the respective radii of the members 79 are, for example, adjusted to extend in the zenith direction and in the nadir direction, the members will fuse into a binocular visual appearance of a target having a vertical diameter drawn on it; that is to say, when the targets are set at a similar fixed distance on the scales 37ª, 38ª and the arms 37 and 38 are set at an angle at which convergence corresponds to the distance of the targets. If the subject has cyclophoria, the radii will appear to be inclined to each other and the amount of this cyclophoria will be measured by the amount of rotative motion through which one of the members 79 must be adjusted to make the fused image appear to be a diametrical line. It is often of advantage to move the radii into a horizontal position and measure in a similar way the amount of the cyclophoria in the horizontal meridians of the subject's eyes. The radius bearing member 79 may be substituted for by a replacement member 82, see Fig. 12, having marked on it a diametrical line 83, the member 82 otherwise being similar to the member 79. To measure cyclotropia and cyclo-fusional amplitudes the diameters 83 are first set in a horizontal position, the position of the targets 73 being as before. If the subject can not fuse the diameters he has cyclotropia. The operator then moves one of the diameters until they just fuse. The amount of movement measured on scale 79 gives a measure of the cyclotropia in degrees.

To measure a subject's cyclo-fusional amplitude, the subject is examined when the two diameters 83 are set in a position in which he can fuse them. The operator then rotates one of the diameters, for example counterclockwise until the subject can no longer maintain fusion. The reading on the scale then gives in degrees one limit of the subject's cyclo-fusional amplitude. The operator then rotates the member 82 clockwise until the subject can no longer maintain fusion. The scale reading in this position gives in degrees the other limit of the subject's cyclo-fusional amplitude.

I claim:

1. The combination in a clinical optical mensuration device, of light transmitting plane reflectors with means for positioning a visual object at a convergence point for the eyes of a subject, means for positioning a reflector in the line of vision of each eye, a bright-point object positioned for superposition of its ocular image by reflection on the ocular image of said visual object, and means for measuring the distance by reflection of said bright-point object in relation to the principal points of the eyes and the angular position thereof in relation to the center of rotation of each eye.

2. In a binocular clinical optical mensuration apparatus, means for positioning a subject, a visual object having detail and means for supporting said object on a radius of each of the subject's eyes, means for adjustably positioning visual objects on lines at an angle to said radius and at known distances therefrom, and means for supporting plane reflectors adapted to transmit light at the junction of said line and said radius for each eye and in a plane perpendicular to a bisector of said angle, and means for varying the virtual direction of said objects viewed by reflection through mensurable angles.

3. In a clinical optical mensuration apparatus, means for positioning a subject, a visual object having detail and means for supporting said object on a radius of the subject's eye, means for adjustably positioning a visual object on a line at an angle to said radius and at a known distance therefrom, and means for supporting a plane reflector adapted to transmit light at the junction of said line and said radius and in a plane perpendicular to a bisector of said angle, a measuring scale for indicating the radial distance of one of said objects from the eye, and means permitting said reflector and the object reflected in it to be turned in a plane about a projection from the center of rotation.

4. In a clinical optical mensuration apparatus, means for positioning a subject, a carriage and slideway for a visual object of direct vision of the subject, a carriage and lateral slideway for an object for vision by reflection mounted for pivotal motion about a vertical axis intersecting the center of rotation of one of the subject's eyes, a light transmitting reflector mounted on said lateral slideway in the line of direct vision, and means for measuring the angular position of said lateral slideway about said axis and in respect to said line of direct vision.

5. In a clinical optical mensuration apparatus, means for positioning a subject, a visual object having detail and means for supporting said object on a radius of the subject's eye, an object having a bright point and means to support said bright point object for movement on a line at an angle to said radius to variable distances, an arm for supporting said bright object, means for supporting a plane reflector adapted to transmit light at the junction of said line and said radius and in a plane perpendicular to a bisector of said angle, and means for varying the angular position of said arm, reflector and bright object through known angles.

6. In a clinical optical mensuration apparatus, means for positioning a subject, a carriage and slideway for a visual object of direct binocular vision of the subject, a carriage and lateral slideway for an object for vision by reflection mounted for pivotal motion about each of the vertical axes intersecting the center of rotation of one of the subject's eyes, a light transmitting reflector mounted on said lateral slideway in the line of direct vision of each eye, and means for measuring the angular position of each of said lateral slideways about its said axis and in respect to the line of direct vision of one eye.

7. The combination in a clinical optical mensuration device of a direct vision object, devices each comprising a reflector and a guideway for a visual object, means permitting said devices to be rotated in the same plane about vertical axes at the distance apart of the interpupillary distance of a subject, and means for severally measuring the angles of such rotation in relation to said direct vision object, whereby to determine severally for each eye the focal distance of objects viewed by the subject in binocular superposition at known and variable angles of convergence of the optical axes.

8. The combination in a clinical optical mensuration device of a direct vision object, devices each comprising a reflector and a guideway for a visual object, means comprising axial pivots severally permitting said devices to be rotated in the same plane about axes normal to a plane of projection from the subject's eyes, means for adjusting the axial pivots for said devices to positions separated by the interpupillary distance of a subject, and means for severally measuring the angles of such rotation in relation to said direct vision object.

9. In a clinical optical mensuration device, the combination with a central bed plate of a positioning rest for the subject, a support for an object having detail and adjustable means for determining the distance of said support and object from the principal point of one of the subject's eyes, a lateral slideway for an indirect vision object mounted for rotation about an axis intersecting said bed plate and the center of rotation of said eye, and a reflector adapted to transmit light interposed between said eye and said object for direct vision, whereby to enable superposition in the eye of direct and reflected images of said objects severally.

10. In a clinical optical mensuration device, the combination with a central bed plate of a positioning rest for the subject, a support for an object having detail and adjustable means for determining the distance of said support and object from the principal point of one of the subject's eyes, a lateral slideway for an indirect vision object adapted for rotation about an axis intersecting said bed plate and the center of rotation of the subject's other eye, and a reflector interposed between said other eye and said object for direct vision, whereby to enable the eyes severally to focus upon a binocular composite of direct and reflected images, respectively, of said objects severally, means for adjusting the angular position of one of said objects, and means to measure the angle through which adjustment is required to secure superposition.

11. In a clinical optical mensuration device, the combination of means severally including distance-reading scales and objects of different character, such as a reading chart and an artificial star, with means for superposing ocular images of an object of one character on those of another, rays from each visible point of an object filling the entire pupil of the eye receiving the rays, said scale means permitting the comparative focal distances for each eye severally and both eyes together of a subject positioned at the apparatus to be measured in respect to eyes converged upon one of said objects.

12. In a clinical optical mensuration device, the combination of means severally including distance-reading scales and objects of different character, such as reading charts and an artificial star, of means for superposing ocular images of an object of one character on those of another, said scale means permitting the comparative focal distances for each eye severally and both eyes together of a subject positioned at the apparatus to be measured in respect to eyes converged upon one of said objects, and means for measuring the angle of convergence concomitantly with measurement of a focal distance.

13. Clinical optical mensuration device for the determination of phorias having therein a positioning rest for the subject, a direct vision object, an object having a bright point, and means for superposing on the image of said direct-vision object in one eye by reflection an image of the bright-point object, and means for measuring the deviation of the axis of one of the subject's eyes comprising means for moving one of said objects in respect to the other through a known angle for determining the angle of deviation of the bright-point object from a position corresponding to the position of the direct-vision object.

14. In a clinical optical mensuration device, the combination with a bed plate and positioning rest for the subject of pivoted slideways, and means for adjusting the position of the pivots for said slideways in relation to the subject and each other.

15. In a clinical optical mensuration device, the combination with a bed plate and positioning rest for the subject of pivoted slideways, means for adjusting the position of the pivots for said slideways in relation to the subject and each other, a slideway for a visual object, and means adapting said slideway to be positioned in fixed relation to said bed plate or to one of said pivoted slideways.

16. In a clinical optical mensuration device, the combination of optical means for fusing as a binocular image the monocular images severally in a subject's eyes of two objects, and means on one of said objects whereby one of its visible characteristics may be rotated in respect to its remaining visible characteristics about a point corresponding to the fixation point of binocular vision through a measurable angle, for use in the determination and mensuration of cyclophorias.

17. Means for determining the relative accommodation of eyes comprising a bright point object positioned at a given distance from the eyes; reflectors, and a pair of visual objects, one at a given distance from each eye and positioned for superposition by reflection upon each other and upon the bright point object, means for excluding the image of the bright point object from the eye not under test, means for moving the image of the bright point object into focus of the eye under test and means for measuring the movement of the bright point object from its position of rest as seen by both eyes simultaneously to its focused position with the eye under test to determine the relative accommodation of the eye under test.

18. Means for determining the focus of each eye while both eyes are looking with a given convergence at fixation means positioned at a predetermined distance from the eyes comprising a test object positioned at a given distance to produce the convergence desired; reflectors, and a pair of visual objects, one for each eye, positioned at a given distance from said eyes and for superposition by reflection upon each other and upon the test object, means for moving the test object into focus when viewed by both eyes, means for measuring the movement of the test object to determine the focus of both eyes simultaneously, means for occulting the test object from the eye not under test without altering the convergence or fixation of either eye, means for moving the test object radially into and out of focus of the eye under test, and means for measuring the movement of the test object for comparison of the result of the focus of both eyes with the result of the focus of the individual eye under test to determine the power of the eyes to change their focus when placed at a given convergence.

19. Means for determining the effect of convergence on the focus of eyes comprising a movable test means, separate fixation means for each eye so positioned that they may be viewed while looking at the test means, said fixation means being adjustable to obtain varying degrees of convergence, means for moving the test means into focus at the various degrees of convergence, and means for measuring the movement of the test means at the various degrees of convergence to obtain the accurate effect of convergence on focus.

20. Means for measuring cyclophorias comprising visual objects having like objects thereon which may be fused and test objects thereon which can be positioned to prevent fusing thereof, one positioned at a given distance from each eye, and means for superposition of the ocular images thereof with each other, means for rotating the test objects until they assume a definite relation with each other when said like objects are fused, and means to measure the rotary movement of said test objects to obtain the extent of cyclophorias present.

21. Means for determining the cyclofusional amplitude of the eyes of a subject comprising a pair of rotatable visual objects, one positioned at a given distance from each eye, and means for fusional super-position of the ocular images thereof with each other, means whereby one of said visual objects may be rotated clockwise until the subject can no longer maintain fusion and counterclockwise until fusion can no longer be maintained in that direction, and means for measuring the degrees of the limits of movements in both the clockwise and counterclockwise direction to obtain the subject's cyclofusional amplitude.

22. Means for measuring the focus of an eye comprising a visual object positioned at a given distance from the eye of a subject, a bright point object, means for causing apparent superposition of its ocular image on the ocular image of said visual object, rays from each visible point of an object filling the entire pupil of the eye receiving these rays, means for moving the bright point object into focus with the eye when in fixed relation with the visual object, and means for measuring the visual distance of the bright point object from the eye to its focused position to determine the accurate focus of the eye.

23. Means for measuring the focus of eyes comprising a member having a head support for fixing the position of the eyes under test, fixation means within the field of direct vision of each eye upon which the said eyes are adapted to be fixed, said fixation means being positioned at a given distance from the eyes, adjustable test means out of the field of direct vision of each eye, means interposed in the direct field of vision of each eye adapted to deflect light rays to afford vision of the test means to permit each eye to be simultaneously focused upon the images of their respective test means and the fixation means, rays from each visible point of said means filling the entire pupil of the eye receiving these rays, and means for measuring the related positions of the fixation means and adjustable test means when in focus to accurately determine the focus of each eye.

24. Means for measuring the focus of eyes comprising fixation means positioned within the field of direct vision of the eyes and upon which the said eyes are adapted to be fused, adjustable test means out of the field of direct vision of each eye, means interposed in the direct field of vision of each eye adapted to deflect light rays to afford vision of the test means to permit each eye to be simultaneously focused upon the images of their respective test means and the fixation means, whereby to superimpose the ocular image of the test means on the fixation means, rays for each visible point of said means filling the entire pupil of the eye receiving these rays, and means for measuring the related positions of the adjustable means and fixation means when in focus to accurately determine the focus of each eye.

25. Means for testing phorias comprising a visual object positioned at a given distance from the eyes of a subject, a test object positioned for superposition of its ocular image by reflection on the ocular image of the visual object in the eye under test, means for excluding the image of the visual object from the eye under test after said image of the visual object and the image of the test object have been placed in superimposed relation and means for measuring the related positions of the ocular image of the test object as seen by the eye under test and the ocular image of the visual object as seen by the eye not under test when the ocular image of the visual object is excluded from the eye under test.

26. Means for testing phorias comprising a visual object positioned at a given distance from the eyes of a subject, a test object positioned for superposition of its ocular image by reflection on the ocular image of the visual object in the eye under test, means for moving the test object into focus, means for excluding the image of the visual object from the eye under test after the images of said visual object and test object have been placed in superimposed relation, and means for measuring the related positions of the ocular image of the test object as seen by the eye under test and the ocular image of the visual object as seen by the eye not under test when the ocular image of said visual object is excluded from the eye under test.

27. Means for determining the muscular balance of the eyes when looking at a chart by finding where one eye turns when the other eye only is looking at the chart comprising a fixation chart placed within the field of vision of both eyes and on which said eyes are fused, test means positioned within the field of vision of the eye under test by reflection and for superposition of its ocular image on the ocular image of the fixation chart and means for excluding the vision of the image of the fixation chart from the eye under test to determine the muscular action of said eye in relation to the other eye fixed on the fixation chart when the fusion faculty of the eyes is broken.

28. A device of the character described, comprising a movable test means adapted to be seen by rays utilizing the entire area of the pupil, means for fixing each eye so positioned that they may be viewed while looking at the test means, said fixation means being changeable to obtain various degrees of convergence, means for moving the test means into focus at the various degrees of convergence, and means for measuring the movement of the test means at the various degrees of convergence to obtain the accurate effect of convergence on focus.

29. A device of the character described, comprising a fixation object positioned at a given distance from the eye of a subject, a test object, means for causing apparent superposition of the ocular image of said test object on the ocular image of said fixation object, means for bringing the test object into focus with the eye when in fixed relation with the fixation object, and means for measuring the visual distance of the test object from the eye to its focused position to determine the accurate focus of the eye.

30. A device of the character described, comprising a fixation object positioned at a given distance from the eye of a subject, a test object adapted to be seen by rays utilizing the entire area of the pupil, means for causing apparent superposition of the ocular image of said test object on the ocular image of said fixation object, means for bringing the test object into focus with the eye when in fixed relation with the fixation object, and means for measuring the visual distance of the test object from the eye to its focused position to determine the acurate focus of the eye.

31. A device of the character described, comprising a fixation object positioned at a given distance from the eye of a subject, a test object adapted to be seen by rays utilizing the entire area of the pupil, means for causing apparent superposition of the ocular image of said test object on the ocular image of said fixation object, optical means for bringing the test object into focus with the eye when in fixed relation with the fixation object, and means for measuring the visual distance of the test object from the eye to its focused position to determine the accurate focus of the eye.

ADELBERT AMES, Jr.